(12) United States Patent
Grushetskyy et al.

(10) Patent No.: US 8,762,370 B1
(45) Date of Patent: *Jun. 24, 2014

(54) DOCUMENT-BASED SYNONYM GENERATION

(71) Applicant: Google Inc., Mountain View, CA (US)

(72) Inventors: Oleksandr Grushetskyy, Cupertino, CA (US); Steven D. Baker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,471

(22) Filed: Feb. 8, 2013

Related U.S. Application Data

(63) Continuation of application No. 13/352,126, filed on Jan. 17, 2012, now Pat. No. 8,392,413, which is a continuation of application No. 13/024,731, filed on Feb. 10, 2011, now Pat. No. 8,161,041, which is a continuation of application No. 12/027,559, filed on Feb. 7, 2008, now Pat. No. 7,890,521.

(60) Provisional application No. 60/900,271, filed on Feb. 7, 2007.

(51) Int. Cl.
*G06F 17/30* (2006.01)
*G06F 17/27* (2006.01)

(52) U.S. Cl.
CPC ...... *G06F 17/30737* (2013.01); *G06F 17/2795* (2013.01)
USPC ........... 707/727; 707/804; 715/258; 715/260; 704/4; 704/9; 704/205

(58) Field of Classification Search
CPC .......... G06F 17/30737; G06F 17/2795; G06F 17/30672; G06F 17/3064; G06F 17/30864
USPC ........ 707/727, 756, 804, 811, 755, 730, 750, 707/728, E17.072, E17.008, E17.064; 704/4, 9, 19, 205, 231; 715/258, 260
See application file for complete search history.

(56) References Cited

U.S. PATENT DOCUMENTS 5,265,065 A * 11/1993 Turtle .................... 707/999.005
5,331,556 A * 7/1994 Black et al. ....................... 704/9

(Continued)

OTHER PUBLICATIONS

M.E.Lesk—"Word-Word Associaties in Document Retrieval System"—American Documentation Journal, Jan. 1996 (p. 27-38).*

(Continued)

*Primary Examiner* — Pierre Vital
*Assistant Examiner* — Anh Ly
(74) *Attorney, Agent, or Firm* — Fish & Richardson P.C.

(57) ABSTRACT

One embodiment of the present invention provides a system that automatically generates synonyms for words from documents. During operation, this system determines co-occurrence frequencies for pairs of words in the documents. The system also determines closeness scores for pairs of words in the documents, wherein a closeness score indicates whether a pair of words are located so close to each other that the words are likely to occur in the same sentence or phrase. Finally, the system determines whether pairs of words are synonyms based on the determined co-occurrence frequencies and the determined closeness scores. While making this determination, the system can additionally consider correlations between words in a title or an anchor of a document and words in the document as well as word-form scores for pairs of words in the documents.

21 Claims, 4 Drawing Sheets

(56) References Cited

U.S. PATENT DOCUMENTS

| | | | |
|---|---|---|---|
| 5,408,410 A * | 4/1995 | Kaji | 704/2 |
| 5,424,947 A | 6/1995 | Nagao et al. | |
| 5,428,707 A | 6/1995 | Gould et al. | |
| 5,500,920 A | 3/1996 | Kupiec | |
| 5,594,641 A | 1/1997 | Kaplan | |
| 5,675,819 A * | 10/1997 | Schuetze | 704/10 |
| 5,708,829 A | 1/1998 | Kadashevich et al. | |
| 5,745,890 A | 4/1998 | Burrows | |
| 5,794,178 A | 8/1998 | Caid et al. | |
| 5,832,474 A * | 11/1998 | Lopresti et al. | 707/999.003 |
| 5,915,251 A | 6/1999 | Burrows et al. | |
| 5,963,940 A | 10/1999 | Liddy et al. | |
| 6,026,388 A * | 2/2000 | Liddy et al. | 707/E17.068 |
| 6,081,775 A * | 6/2000 | Dolan | 704/10 |
| 6,128,613 A * | 10/2000 | Wong et al. | 707/738 |
| 6,137,911 A * | 10/2000 | Zhilyaev | 382/225 |
| 6,253,170 B1 * | 6/2001 | Dolan | 704/10 |
| 6,308,149 B1 | 10/2001 | Gaussier et al. | |
| 6,353,827 B1 | 3/2002 | Davies et al. | |
| 6,453,315 B1 | 9/2002 | Weissman et al. | |
| 6,466,901 B1 * | 10/2002 | Loofbourrow et al. | 704/9 |
| 6,618,727 B1 | 9/2003 | Wheeler et al. | |
| 6,757,692 B1 * | 6/2004 | Davis et al. | 707/692 |
| 6,788,759 B2 | 9/2004 | Op De Beek et al. | |
| 6,847,960 B1 * | 1/2005 | Li et al. | 707/E17.108 |
| 7,003,442 B1 * | 2/2006 | Tsuda | 704/9 |
| 7,003,516 B2 | 2/2006 | Dehlinger et al. | |
| 7,155,427 B1 * | 12/2006 | Prothia et al. | 707/694 |
| 7,251,637 B1 | 7/2007 | Caid et al. | |
| 7,257,574 B2 | 8/2007 | Parikh | |
| 7,483,829 B2 | 1/2009 | Murakami et al. | |
| 7,490,092 B2 | 2/2009 | Sibley et al. | |
| 7,860,706 B2 | 12/2010 | Abir | |
| 7,890,521 B1 * | 2/2011 | Grushetskyy et al. | 707/755 |
| 7,925,498 B1 * | 4/2011 | Baker et al. | 704/9 |
| 8,161,041 B1 * | 4/2012 | Grushetskyy et al. | 707/727 |
| 8,392,413 B1 * | 3/2013 | Grushetskyy et al. | 707/727 |
| 8,401,841 B2 * | 3/2013 | Roitblat et al. | 704/9 |
| 2002/0002550 A1 | 1/2002 | Berman | |
| 2002/0111792 A1 | 8/2002 | Cherny | |
| 2003/0023421 A1 | 1/2003 | Finn et al. | |
| 2003/0061122 A1 * | 3/2003 | Berkowitz et al. | 705/27 |
| 2004/0064447 A1 * | 4/2004 | Simske et al. | 707/5 |
| 2004/0122656 A1 | 6/2004 | Abir | |
| 2004/0181759 A1 | 9/2004 | Murakami et al. | |
| 2004/0225667 A1 * | 11/2004 | Hu et al. | 707/100 |
| 2005/0060304 A1 | 3/2005 | Parikh | |
| 2005/0108001 A1 | 5/2005 | Aarskog | |
| 2005/0216443 A1 | 9/2005 | Morton et al. | |
| 2006/0129538 A1 | 6/2006 | Baader et al. | |
| 2006/0253476 A1 | 11/2006 | Roth et al. | |
| 2007/0038621 A1 | 2/2007 | Weyand et al. | |
| 2007/0100823 A1 | 5/2007 | Inmon | |
| 2007/0124293 A1 | 5/2007 | Lakowske et al. | |
| 2007/0282824 A1 | 12/2007 | Ellingsworth | |
| 2008/0033944 A1 * | 2/2008 | Frank | 707/6 |
| 2008/0140643 A1 * | 6/2008 | Ismalon | 707/5 |
| 2008/0249983 A1 | 10/2008 | Meisels et al. | |
| 2009/0177463 A1 * | 7/2009 | Gallagher et al. | 704/10 |

OTHER PUBLICATIONS

JianQiang Wang—"Matching Meaning for Cross-language Information retrieval" (p. 1-209) Jun. 12, 2005.*

Gregory Grefenstette—"comparing Two Language Identification Schemes"—In Proceedings of 3rd International Conference on Statistical Analysis of Textual Data (JADT), Dec. 11-13, 1995, vol. II, pp. 263-268.

Christopher Landauer and Clinton Mah—"Message extraction through estimation of relevance"—Proccedings of the 3rd annual ACM Conference on Research and Development in Information Retrieval—1980, (pp. 117-138).

Lamontagne et al.—"Using Statistical Word Associations for the Retrieval of Strongly-Textual Cases"—Plairs 2003 pp. 124-128.

Office Action prepared for related case (U.S. Appl. No. 11/582,767), mailed from USPTO on Sep. 15, 2008.

Xu et al., "Corpus-Based Stemming Using Cooccurrence of Word Variants"—Jouran ACM Transactions on Information systems (TOIS), vol. 16, Issue 1, Jan. 1998 (pp. 61-81).

Xu et al., "Corpus-specific Stemming Using Word Form Co-Occurrence," Proceedings for Fourth Annual Symposium on Document Analysis and Information Retrieval, 1995, pp. 147-159.

Napps, "Morphemic relationshios in the lexicon: Are they distinct from semantic and formal relationships?"—Memory & Cognition, Psychonomic Society, Inc., vol. 17, No. 6, 1989, pp. 729-739.

* cited by examiner

DOCUMENT-BASED SYNONYM GENERATION

CROSS-REFERENCE TO RELATED APPLICATIONS

This application is a continuation of U.S. patent application Ser. No. 13/352,126, now U.S. Pat. No. 8,392,413, filed on Jan. 17, 2012 entitled "Document-Based Synonym Generation," which is a continuation of U.S. patent application Ser. No. 13/024,731, now U.S. Pat. No. 8,161,041, filed on Feb. 10, 2011 entitled "Document-Based Synonym Generation," which is a continuation of U.S. patent application Ser. No. 12/027,559, now U.S. Pat. No. 7,890,521, filed on Feb. 7, 2008 entitled "Document-Based Synonym Generation," and U.S. Provisional Application No. 60/900,271, filed on Feb. 7, 2007 entitled "Document-Based Synonym Generation." The disclosure of the foregoing applications is incorporated herein by reference in its entirety.

BACKGROUND

The present invention generally relates to the field of information retrieval, and more specifically to the task of identifying synonyms for words to facilitate retrieving documents in response to queries which contain the words.

The World Wide Web (web) contains a vast amount of freely available information. However, locating a relevant item of information on the web can be a challenging task. Note that this problem continues to increase as the amount of information available on the web continues to grow.

Search engines can often help users to locate and retrieve a document of interest on the web. However, users often fail to select effective query terms during the searching process. For example, a user may enter the query [web hosting+fort wayne] when the city of Fort Wayne is usually referred to as Ft. Wayne. Or, a user may enter [free loops for flash movie] when most relevant pages use the term "music," rather than "loops" and the term "animation" rather than "movie." Thus, documents that satisfy a user's informational needs may use different terms than the specific query terms chosen by the user to express a concept of interest. Note that this problem becomes more of an issue as the number of terms in a query increases. For queries longer than three or four words, there is a strong likelihood that at least one of the terms is not the best term to describe the user's informational need.

Hence, there is a need to modify and/or expand user queries to include synonyms for query terms, so that retrieved documents will better meet the user's informational needs.

Unfortunately, solving this problem has proven to be a difficult task. A simple approach is to use pre-constructed synonym information, for example from a thesaurus or a structured lexical database. However, thesaurus-based systems have various problems. For example, they are often expensive to construct, and are generally restricted to one language.

Some systems consider how often terms are substituted for each other during query sessions to determine whether the terms are synonyms. However, there does not exist enough query data for rare words and rare languages to identify synonyms in this way.

Other systems consider stemming relationships to identify synonyms. However, stemming is not always accurate. For example, the words "university" and "universal" share the same stem, but have very different meanings. Furthermore, many good synonyms are not covered by stemming, such as "wolfs" and "wolves," or "wales" and "welsh."

Accordingly, what is needed is a method and an apparatus that identifies potential synonyms to facilitate searching operations without the above-described problems.

SUMMARY

One embodiment of the present invention provides a system that automatically generates synonyms for words from documents. During operation, this system determines co-occurrence frequencies for pairs of words in the documents. The system also determines closeness scores for pairs of words in the documents, wherein a closeness score indicates whether a pair of words are located so close to each other (for example, in sequential distance or logical distance) that the words are likely to occur in the same sentence or phrase. Finally, the system determines whether pairs of words are synonyms based on the determined co-occurrence frequencies and the determined closeness scores.

In some embodiments, determining a closeness score for a pair of words includes dividing the probability that the words are very close to each other by the probability that the words are near each other.

In some embodiments, words are determined to be "very close" to each other if they are less than a small number of words apart, such as 4 words, and words are determined to be "near" each other if they are within a pre-specified number words of each other, such as 100 words.

In some embodiments, while determining whether words are synonyms, the system considers a high closeness score between two words to indicate that the two words are unlikely to be synonyms because synonyms rarely occur in the same sentence or phrase.

In some embodiments, the system additionally generates correlations between words in a title or an anchor of a document and words in the document. In this variation, determining whether pairs of words are synonyms additionally involves considering the generated correlations.

In some embodiments, the system additionally determines word-form scores for pairs of words in the documents, wherein a high word-form score indicates that words share common portions, but have differing portions that are consistent with word form rules. Note that word-form rules specify a set of edits that that are allowed to a base word to produce gender-specific, plurality-related or other variations of the base word. For example, a high word-form score can indicate that: a pair of words share a common prefix but have different suffixes, wherein the different suffixes are consistent with word-form rules; a pair of words share a common suffix but have different prefixes, wherein the different prefixes are consistent with word-form rules; or a pair of words share a common prefix and a common suffix, but have different middle sections, wherein the different middle sections are consistent with word-form rules. In this variation, determining whether pairs of words are synonyms additionally involves considering the word-form scores.

In some embodiments, the system automatically generates the word-form rules from synonymous words that share common prefixes and/or suffixes.

In some embodiments, while determining whether a candidate word is a synonym for a target word, the system considers whether the candidate word is much more common than the target word. If so, the candidate word is not a synonym because search results produced by the candidate word will overwhelm search results produced by the target word. The system also considers whether the candidate word is much less common than the target word. If so, the candidate word is not a synonym because using the candidate word will produce very few additional search results.

In some embodiments, the system additionally processes a query. This involves first receiving the query which contains a set of words. Next, the system uses the synonyms which were automatically generated from the documents to identify one or more synonyms for the one or more words in the query. The system then generates an altered query using the one or more synonyms, and uses the altered query to produce search results. In one embodiment of the present invention, alternative synonyms are presented to a user through a user interface to enable the user to select the synonyms that are used to produce the altered query. Also note that when search results are returned the system can highlight or bold synonymous terms in search results.

Another embodiment of the present invention provides another system that automatically generates synonyms for words from documents. During operation, this system determines co-occurrence frequencies for pairs of words in the documents. The system also determines word-form scores for pairs of words in the documents, wherein a high word-form score indicates that a pair of words share a common prefix but have different endings, wherein the different endings are consistent with word-form rules. Finally, the system determines whether pairs of words are synonyms based on the determined co-occurrence frequencies and the determined word-form scores.

DETAILED DESCRIPTION

The following description is presented to enable one of ordinary skill in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling, Ranking and Searching Processes

Figure 1:
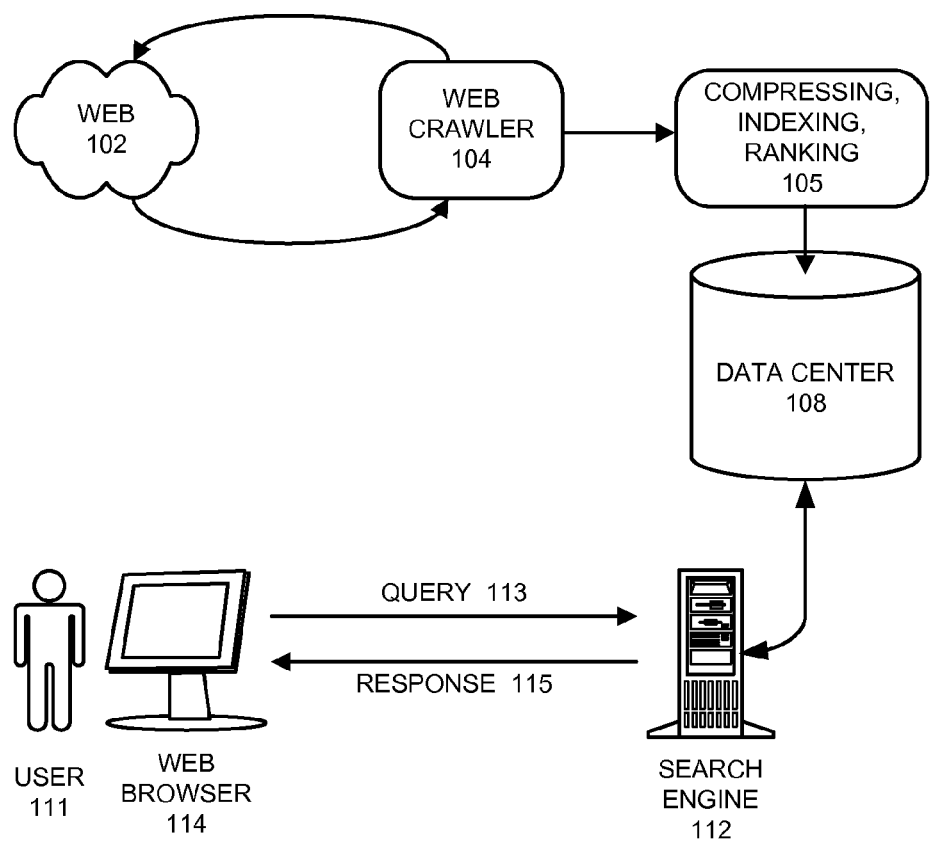
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

Generating Altered Queries

Figure 2:
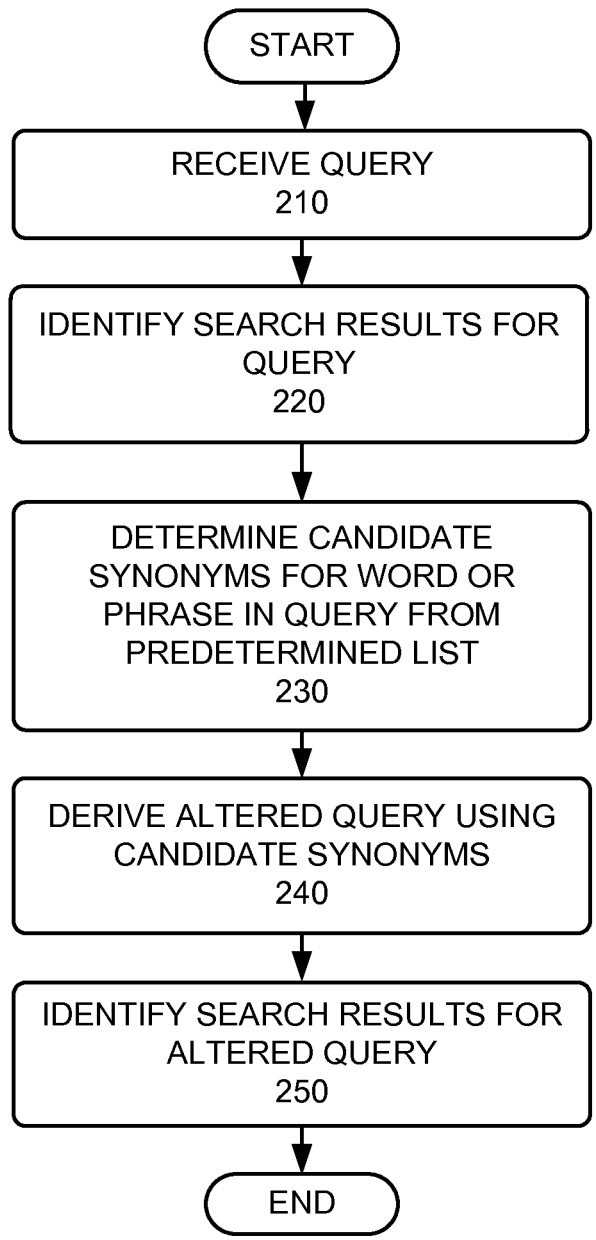
FIG. 2 presents a flowchart illustrating a method for generating altered queries according to one embodiment of the present invention.

FIG. 2 presents a flowchart illustrating a method for generating altered queries according to one embodiment of the present invention. Initially, a search query is received from a client 110. In one embodiment, a front-end server is responsible for receiving the search query from the client (step 210). This front-end server provides the query to the search engine, which evaluates the query. In addition, the front-end server and/or search engine maintains various log files or lookup tables that storing each received query, as well as other information. More particularly, each query can be stored with a user identifier that identifies the particular browser and/or computer from which the query was received, a timestamp for the query, and a list of some number of the search results (e.g., a list of the top ten document IDs from the search). Other information related to user context or the search itself may also be stored.

Next, a list of search results for the search query is identified (step 220). In this example, the search engine evaluates the query to retrieve a set of search results in accordance with the search query and returns the results to the front-end server. The search engine communicates with one or more content servers to select documents that are relevant to the user's search query. Note that a content server stores a large number of indexed documents, indexed (and/or retrieved) from different websites. Alternatively, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. The search engine assigns a score to each document based on the document's page rank (and/or other query-independent measure of the document's importance), as well as one or more query-dependent signals of the document's importance (e.g., the location and frequency of search terms in the document).

Figure 3:
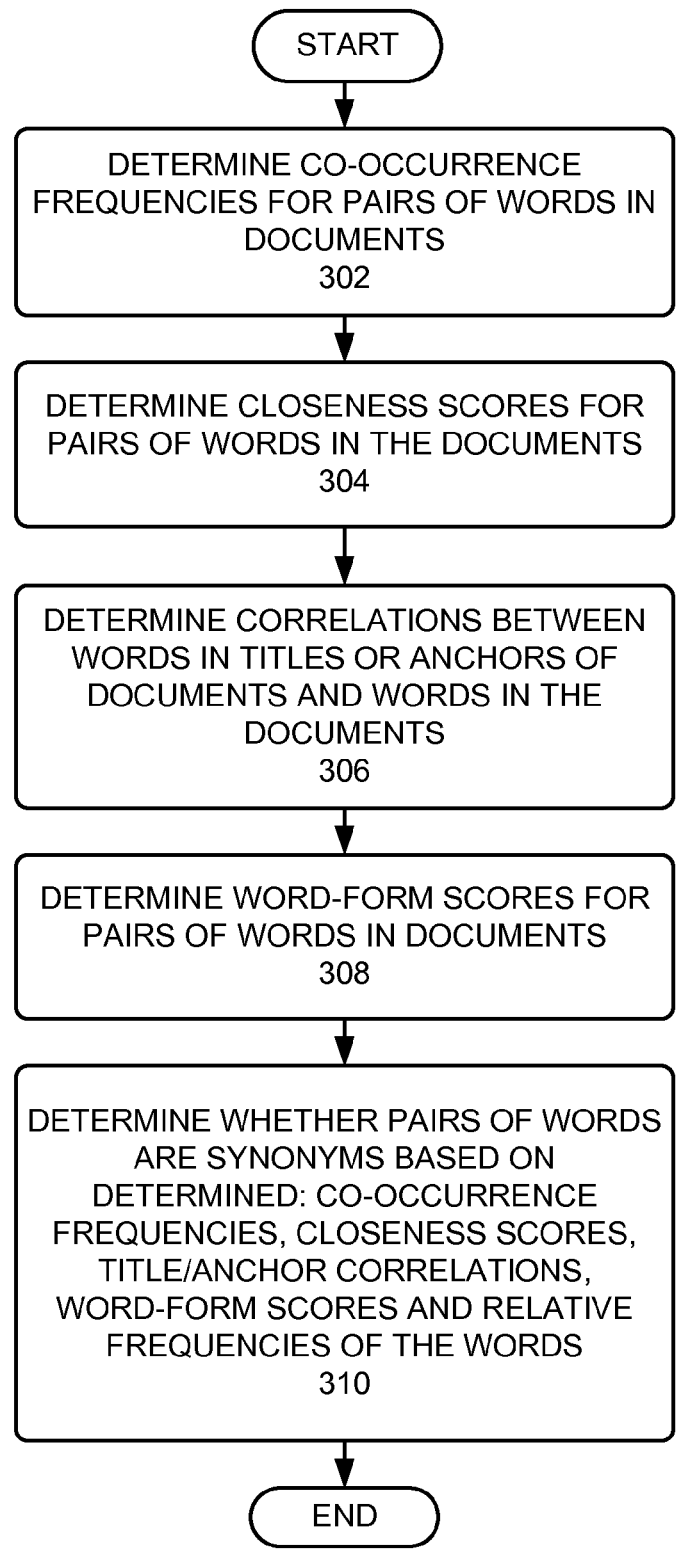
FIG. 3 presents a flow chart illustrating the process of automatically generating synonyms from words in a document in accordance with an embodiment of the present invention.

Then, one or more synonymous terms are identified (step 230) from a predetermined list. Formation of the predetermined list may be accomplished using various processes. More specifically, FIG. 3 presents a flowchart illustrating a process for determining automatically identifying synonyms from documents according to one embodiment of the present invention.

Next, referring back to FIG. 2, one or more altered queries are derived using the synonymous terms (step 240). Various methods exist for deriving alternative queries from the synonymous terms. In one embodiment, alternative queries are suggested that include the synonym, either as a substitution in or an addition to the query.

In another embodiment, the synonym is treated as equivalent to the original phrase automatically for purposes of document retrieval. For example, the original query can be modified by replacing the phrase with a synonym or a disjunction of the original phrase and a synonym when producing search results for the query.

From the above steps, a list of altered search results for the altered query is identified (step 250). In one embodiment, this list may include a maximum number of results.

Generating Synonyms from Documents

FIG. 3 presents a flow chart illustrating the process of automatically generating synonyms from words in a document in accordance with an embodiment of the present invention. First, the system determines co-occurrence frequencies for pairs of words in the documents (step 302). This can be easily accomplished using well-known statistical techniques.

The system also determines closeness scores for pairs of words in the documents (step 304), wherein a closeness score indicates whether a pair of words are located so close to each other that the words are likely to occur in the same sentence or phrase. For example, in one embodiment of the present invention, determining the closeness score for a pair of words involves dividing the probability that the words are very close to each other (e.g., within 4 words) by the probability that the words are near each other (e.g., within 100 words). Note that the system considers a high closeness score between two words to indicate that the two words are unlikely to be synonyms because synonyms rarely occur in the same sentence or phrase.

The system additionally generates correlations between words in a titles or URL anchors for documents and words in the documents (step 306). This helps to identify synonyms because a document tends to contain synonyms for words in the title or the anchor of the document.

The system also determines word-form scores for pairs of words in the documents (step 308). A high word-form score between a pair of words generally indicates that the words share a common portion and have differing portions, wherein the differing portions are consistent with word-form rules. A word for rule indicates how words with a common stem can vary. For example a high word form score can indicate that the pair of words: (1) share a common prefix but have different suffixes, wherein the different suffixes are consistent with word-form rules; (2) share a common suffix but have different prefixes, wherein the different prefixes are consistent with word-form rules; or (3) share a common prefix and a common suffix, but have different middle sections, wherein the different middle sections are consistent with word-form rules. The process of determining word-form rules is discussed in more detail below with reference to the flow chart which appears in FIG. 4.

Finally, the system determines whether pairs of words are synonyms based on the determined co-occurrence frequencies, closeness scores, title/anchor correlations, and word-form scores (step 310). Note that the closeness score is a negative indicator of a synonym, whereas the other factors are positive indicators.

While determining whether words are synonyms, the system can also consider relative frequencies of pairs of words. For example, if the candidate word is much more common than the target word, the candidate word will generally not be a good synonym because search results produced by the candidate word will overwhelm search results produced by the target word. Also, if the candidate word is much less common than the target word, the candidate word will generally not be a good synonym because using the candidate word will produce very few additional search results.

Generating Word-Form Rules

Figure 4:
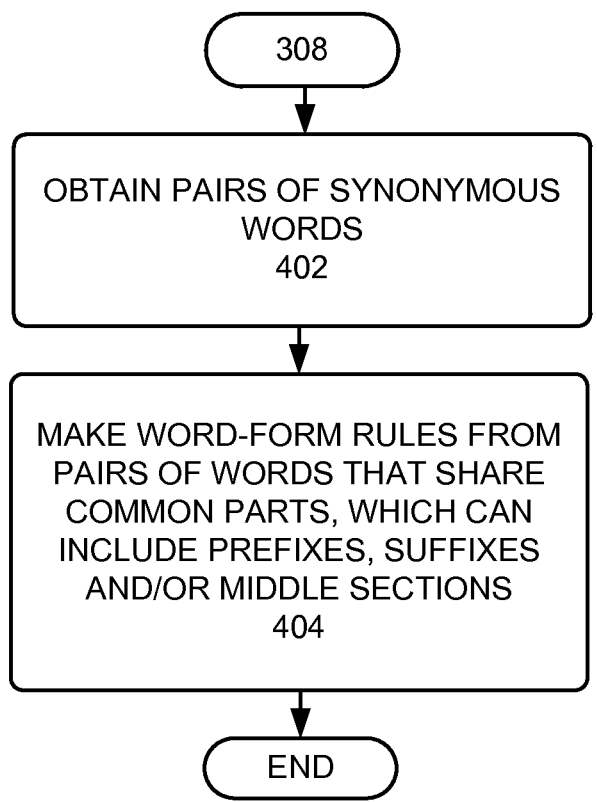
FIG. 4 presents a flow chart illustrating the process of automatically generating word-form rules in accordance with an embodiment of the present invention.

FIG. 4 presents a flow chart illustrating the process of automatically generating word-form rules in accordance with an embodiment of the present invention. The system first obtains pairs of words that are likely to be synonyms (step 402). This can involve considering a number of factors, such as the co-occurrence frequencies, closeness scores and title/anchor correlations described above. It can also involve obtaining pair of synonymous words using other techniques, such as examining word substitutions during query sessions. Next, the system can generate word-form rules which indicate how related words which share a common stem can vary. For example, the system can generate word-form rules for pairs of words that share common parts, which can include prefixes, suffixes and/or middle sections, and wherein remaining parts of the pair of words are consistent with word-form rules (step 404).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
selecting a pair of words;
receiving a document having an associated title or anchor;
determining that a first word of the pair of words occurs in the title or anchor of the document and that a different, second word of the pair of words occurs within the document;
determining, by one or more computers, that the first word and the different, second word are synonyms based at least upon determining that the first word of the pair of words occurs in the title or anchor of the document and that the different, second word of the pair of words occurs within the document; and
generating an alternative search query for a search query that includes the first word or the different, second word using the first word as a substitute for the second word in the alternative search query or using the second word as a substitute for the first word in the alternative search query.

2. The method of claim 1, wherein the anchor is a Uniform Resource Locator (URL) anchor.

3. The method of claim 1, comprising:
receiving the search query;
obtaining search results responsive to the alternative search query; and
providing the search results in response to receiving the search query.

4. The method of claim 1, comprising:
determining a co-occurrence frequency for the first word and the second word in a collection of documents; and
determining that the pair of words are synonyms based at least on the determined co-occurrence frequency.

5. The method of claim 1, comprising generating a correlation between the first word of the pair of words occurring in the title or anchor of the document and the different, second word of the pair of words occurring within the document, wherein determining that the first word and the different, second word are synonyms based at least upon the generated correlation between the first word of the pair of words occurring in the title or anchor of the document and the different, second word of the pair of words occurring within the document.

6. The method of claim 1, comprising determining a relationship between the first word of the pair of words occurring in the title or anchor of the document and the different, second word of the pair of words occurring within the document,
wherein determining that the first word and the different, second word are synonyms is based at least upon the determined relationship between the first word of the pair of words occurring in the title or anchor of the document and the different, second word of the pair of words occurring within the document.

7. The method of claim 6, wherein determining a relationship between the first word of the pair of words occurring in the title or anchor of the document and the different, second word of the pair of words occurring within the document comprises determining a frequency that the different, second word of the pair of words occurs in documents when the first word of the pair of words occurs in the title or anchor of the documents.

8. A system comprising:
one or more computers and one or more storage devices storing instructions that are operable, when executed by the one or more computers, to cause the one or more computers to perform operations comprising:
selecting a pair of words;
receiving a document having an associated title or anchor;
determining that a first word of the pair of words occurs in the title or anchor of the document and that a different, second word of the pair of words occurs within the document;
determining that the first word and the different, second word are synonyms based at least upon determining that the first word of the pair of words occurs in the title or anchor of the document and that the different, second word of the pair of words occurs within the document; and
generating an alternative search query for a search query that includes the first word or the different, second word using the first word as a substitute for the second word in the alternative search query or using the second word as a substitute for the first word in the alternative search query.

9. The system of claim 8, wherein the anchor is a Uniform Resource Locator (URL) anchor.

10. The system of claim 8, wherein the operations comprises:
receiving the search query;
obtaining search results responsive to the alternative search query; and
providing the search results in response to receiving the search query.

11. The system of claim 8, wherein the operations comprise:
determining a co-occurrence frequency for the first word and the second word in a collection of documents; and
determining that the pair of words are synonyms based at least on the determined co-occurrence frequency.

12. The system of claim 8, wherein the operations comprise generating a correlation between the first word of the pair of words occurring in the title or anchor of the document and the different, second word of the pair of words occurring within the document,
wherein determining that the first word and the different, second word are synonyms based at least upon the generated correlation between the first word of the pair of words occurring in the title or anchor of the document and the different, second word of the pair of words occurring within the document.

13. The system of claim 8, wherein the operations comprise determining a relationship between the first word of the pair of words occurring in the title or anchor of the document and the different, second word of the pair of words occurring within the document,
wherein determining that the first word and the different, second word are synonyms is based at least upon the determined relationship between the first word of the pair of words occurring in the title or anchor of the document and the different, second word of the pair of words occurring within the document.

14. The system of claim 13, wherein determining a relationship between the first word of the pair of words occurring in the title or anchor of the document and the different, second word of the pair of words occurring within the document comprises determining a frequency that the different, second word of the pair of words occurs in documents when the first word of the pair of words occurs in the title or anchor of the documents.

15. A computer program product, encoded on one or more non-transitory computer storage media, comprising instructions that when executed by one or more computers cause the one or more computers to perform operations comprising:
selecting a pair of words;
receiving a document having an associated title or anchor;
determining that a first word of the pair of words occurs in the title or anchor of the document and that a different, second word of the pair of words occurs within the document;
determining that the first word and the different, second word are synonyms based at least upon determining that the first word of the pair of words occurs in the title or anchor of the document and that the different, second word of the pair of words occurs within the document; and
generating an alternative search query for a search query that includes the first word or the different, second word using the first word as a substitute for the second word in the alternative search query or using the second word as a substitute for the first word in the alternative search query.

16. The computer program product of claim 15, wherein the anchor is a Uniform Resource Locator (URL) anchor.

17. The computer program product of claim 15, wherein the operations comprises:
receiving the search query;
obtaining search results responsive to the alternative search query; and
providing the search results in response to receiving the search query.

18. The computer program product of claim 15, wherein the operations comprise:
determining a co-occurrence frequency for the first word and the second word in a collection of documents; and
determining that the pair of words are synonyms based at least on the determined co-occurrence frequency.

19. The computer program product of claim 15, wherein the operations comprise generating a correlation between the first word of the pair of words occurring in the title or anchor of the document and the different, second word of the pair of words occurring within the document, wherein determining that the first word and the different, second word are synonyms based at least upon the generated correlation between the first word of the pair of words occurring in the title or anchor of the document and the different, second word of the pair of words occurring within the document.

20. The computer program product of claim 15, wherein the operations comprise determining a relationship between the first word of the pair of words occurring in the title or anchor of the document and the different, second word of the pair of words occurring within the document, wherein determining that the first word and the different, second word are synonyms is based at least upon the determined relationship between the first word of the pair of words occurring in the title or anchor of the document and the different, second word of the pair of words occurring within the document.

21. The computer program product of claim 20, wherein determining a relationship between the first word of the pair of words occurring in the title or anchor of the document and the different, second word of the pair of words occurring within the document comprises determining a frequency that the different, second word of the pair of words occurs in documents when the first word of the pair of words occurs in the title or anchor of the documents.

\* \* \* \* \*

UNITED STATES PATENT AND TRADEMARK OFFICE
CERTIFICATE OF CORRECTION

PATENT NO. : 8,762,370 B1  
APPLICATION NO. : 13/763471  
DATED : June 24, 2014  
INVENTOR(S) : Oleksandr Grushetskyy and Steven D. Baker It is certified that error appears in the above-identified patent and that said Letters Patent is hereby corrected as shown below:

Title Page

Page 1, Col. 2, line 1 (Other Publications): Delete "Associaties" and insert -- Associates --, therefor.

Page 2, Col. 2, line 8 (Other Publications): Delete "Procceedings" and insert -- Proceedings --, therefor.

Page 2, Col. 2, line 12 (Other Publications): Delete "Plairs" and insert -- Flairs --, therefor.

Page 2, Col. 2, line 19 (Other Publications): Delete "for" and insert -- for the --, therefor.

Page 2, Col. 2, line 21 (Other Publications): Delete "relationshios" and insert -- relationships --, therefor.

In the Claims

Column 7, lines 50-51, in claim 10: Delete "comprises:" and insert -- comprise: --, therefor.

Column 8, line 51, in claim 17: Delete "comprises:" and insert -- comprise: --, therefor.

Signed and Sealed this  
Twenty-first Day of October, 2014

Michelle K. Lee  
*Deputy Director of the United States Patent and Trademark Office*